(No Model.)
G. BETTINI.
PHONOGRAPH.
No. 488,381. Patented Dec. 20, 1892.
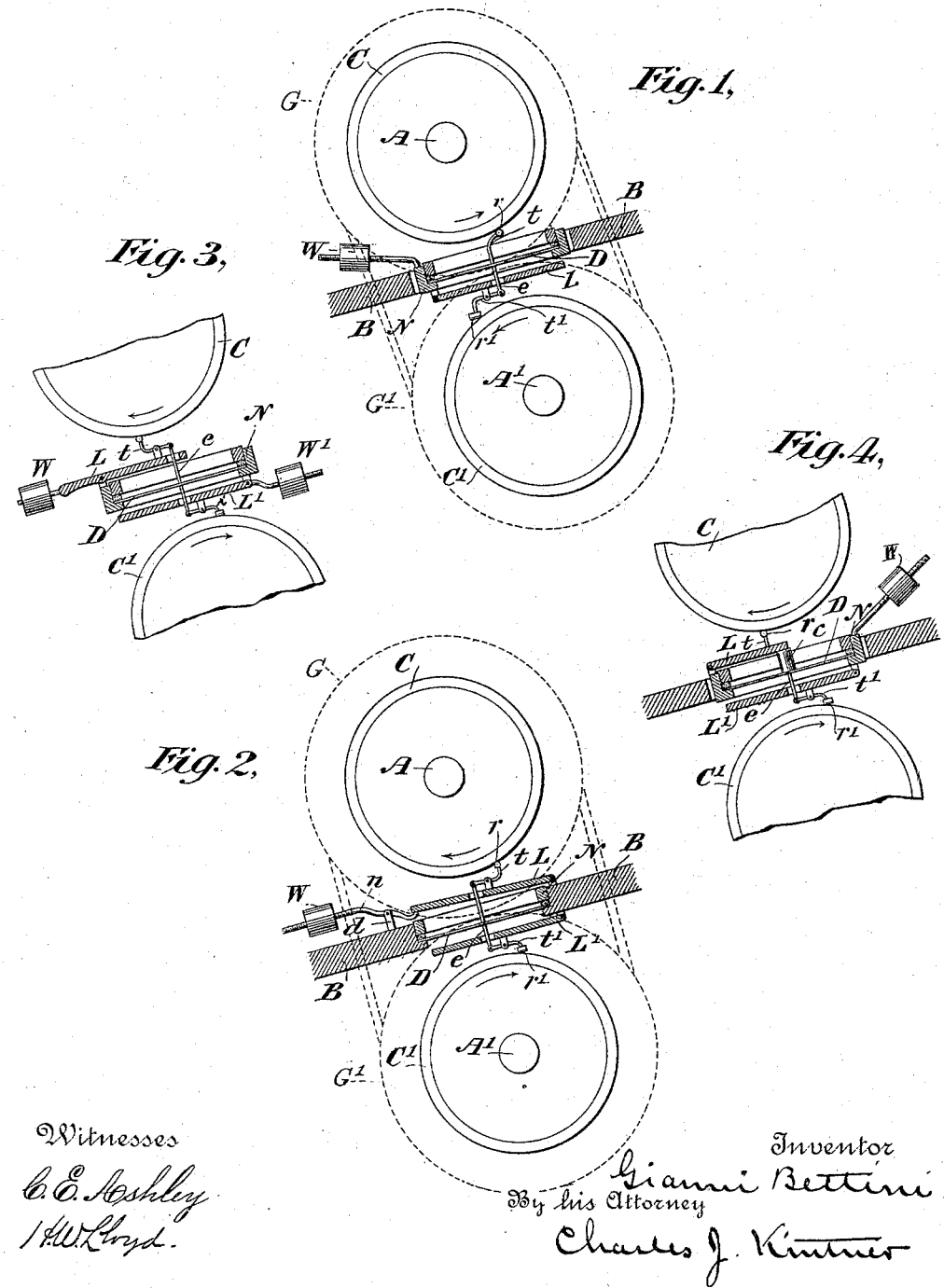
Witnesses
C. E. Ashley
I. W. Lloyd
Inventor
Gianni Bettini
By his Attorney
Charles J. Kintner

UNITED STATES PATENT OFFICE.

GIANNI BETTINI, OF NEW YORK, N. Y.

PHONOGRAPH.

SPECIFICATION forming part of Letters Patent No. 488,381, dated December 20, 1892.

Application filed March 14, 1892. Serial No. 424,815. (No model.)

*To all whom it may concern:*

Be it known that I, GIANNI BETTINI, a subject of the King of Italy, and a resident of New York, in the county of New York and State of New York, have made certain new and useful Improvements in Phonographs, of which the following is a specification.

My invention is directed particularly to a novel apparatus for duplicating phonographic records, and its object is to simplify and cheapen the present expensive methods of making records where it is desired to place the same record upon many phonogram surfaces or cylinders. I accomplish this object with the apparatus hereinafter described, but particularly pointed out in the claims at the end of this specification.

In order that my invention may be fully understood reference is had to the accompanying drawings, in all of which like letters of reference represent like parts wherever used.

All of the figures of the drawings (four in number) are sectional views of modified forms of my novel apparatus designed to accomplish the result above indicated—

Referring first to Figure 1—A represents the axis—and C a phonogram cylinder carried thereby, and upon which has been placed a record which it is desired to duplicate mechanically.

B B represent parts of the frame of the apparatus which sustain my reproducing device.

C' represents another phonogram cylinder upon which it is desired to make a duplicate record, this cylinder being carried by an axis (A') parallel to the axis (A).

G G' are pulleys carried by the axes A and A' and connected together by a belt or cord so that they will rotate with the axes (A and A') and cylinders (C C').

N is a diaphragm supporting ring in which is secured a diaphragm D, this ring being in this instance pivotally supported on an axis parallel with the axes (A and A') and provided with a regulating arm and adjustable weight (W). To the upper side of the diaphragm is attached a record reproducing stylus (t) and to the lower side of this diaphragm is secured a pivoted recording or record producing stylus (t') the fulcrum of which is attached to a lever (L) the arrangement being such that the free end of the pivoted reproducing stylus (t') is adapted to bear upon the surface of the duplicating phonogram cylinder (C'). The lever (L) it will be observed is pivoted at one end to the ring (N), and the arrangement is such that the reproducing stylus (t') will follow accurately the movements of the stylus (t).

The operation of this apparatus is as follows:—The axis (A) is set in motion in its usual way in the direction of the arrow, the stylus (t) having been properly adjusted in connection with the original record upon the phonogram cylinder (C) and the recording or record producing stylus (t') having been properly adjusted to bear upon the surface of the cylinder (A') with the desired pressure through the agency of the adjustable weight (W). The pulley (G) therefore, transmits to the pulley (G') motion in the direction of the lower arrow, so that the cylinder (C') rotates in the same direction as does the cylinder (C), and a correct record is therefore, transmitted from the stylus (t) through the link (e) and diaphragm (D) to the pivoted recording or record producing stylus (t'), thus causing the part r' to cut or produce in the cylinder (C') an accurate duplication of the record on the cylinder (C). After the record has been thus duplicated the second cylinder (C') may be removed and the operation repeated with duplicate cylinders for an indefinite number of times. In the form shown in Fig. 2 the diaphragm (D) is fixedly secured to the parts (B) of the frame and the adjustable feature, [which is attributable in Fig. 1 to the pivoted diaphragm, adjustable weight (W) and pivoted lever (L)] is effected through the agency of two pivoted levers (L and L') adjustable weight (W) and a third lever (n) the latter pivotally secured to one part (B) on a standard (d) with its short arm under the free end of the upper lever (L). In this instance it will be noted that the styles (t and t') are pivoted respectively to the levers (L and L') and are joined to each other through the agency of the diaphragm (D) and a rigid wire or connecting link (e).

The mode of operation of the form shown in Fig. 2 is not essentially different from that shown in Fig. 1.

In the form shown in Fig. 3, the diaphragm is rigidly supported, the same as in Fig. 2 and adjustable weights (W and W') are secured to the outer ends of the levers (L and L') the styles (t and t') being pivotally secured to these levers and attached to each other through link (e) and diaphragm (D).

In Fig. 4 the diaphragm ring (N) is pivoted to the parts (B B) the same as in Fig. 1, and the stylus (t) is attached directly to the free end of the lever (L). This lever is pivoted at its other end directly to the diaphragm ring (N) and its free end connected directly to the diaphragm by a piece of cork (c), the diaphragm, in turn, being connected to the lower stylus (t') by a link (e). The stylus (t') is pivoted as in Fig. 1 to a lever (L').

In Figs. 3 and 4, the pulleys (G and G') are not shown although it will be understood that some means of operatively connecting the two phonogram cylinders (C C') will always be required. Of course other means than pulleys may be utilized for rotating the cylinders (C and C') together. The operation of these modified forms is entirely obvious in view of the description and the mode of operation of the modified forms illustrated in Fig. 1.

I do not limit myself to the specific forms of mechanism herein shown and described for duplicating phonogram records, as I believe I am entitled to claim broadly apparatus for duplicating such records through the agency of connected pivoted styles and my claims are generic in this particular.

I am aware of the record reproducing apparatus shown in Figs. 1 and 2 of the drawings of patent to S. Taintor, No. 341,287, granted May 4, 1886, and I make no claim hereinafter broad enough to include such a structure or any method involved in the use of such structure.

Having thus described my invention, what I claim and desire to secure by Letters-Patent of the United States is:—

1. A pair of independent phonogram surfaces, one of which has a record on its face; intermediate gearing as a belt and pulleys for causing said surfaces to move simultaneously; a stylus adapted to follow the conformation of the record, and a second stylus with intermediate connections adapted to reproduce the record on the second surface—substantially as described—

2. A pair of independent phonogram surfaces, one of which has a record on its face; intermediate gearing as a belt and pulleys for causing said surfaces to move together; a stylus resting on the record on the first surface; a second stylus resting on the face of the second surface, and an intermediate elastic or yielding support as a diaphragm with adjustable connections, as described—

3. A pair of independent phonogram cylinders sustained by parallel axles geared together, one of said cylinders having a record on its face; a reproducing stylus adapted to follow this record; a recording stylus attached to the reproducing stylus by intermediate connections, and adapted to make a duplicate record on the face of the second cylinder—substantially as described—

4. A pair of phonogram cylinders sustained by parallel axles geared together, one of said cylinders having a prepared record on its face; a pivoted reproducing stylus fulcrumed to a lever; a pivoted record producing stylus resting normally on the face of the second phonogram cylinder and fulcrumed to a second lever with connections between said styles, whereby a duplicate record is made upon the face of the second cylinder, as the two are revolved—substantially as described—

GIANNI BETTINI.

Witnesses:
C. J. KINTNER,
F. GRIESSMAN.